United States Patent

Bright et al.

[11] Patent Number: 5,855,932
[45] Date of Patent: Jan. 5, 1999

[54] MOLDED ARTICLE RETRIEVAL APPARATUS

[75] Inventors: Timothy L. Bright; Christopher G. Bright, both of Greenville; Jeffrey L. Patrick, Huber Heights, all of Ohio

[73] Assignee: Electra Form, Inc., Vandalia, Ohio

[21] Appl. No.: 713,667

[22] Filed: Sep. 13, 1996

[51] Int. Cl.[6] .................................................. B29C 45/42
[52] U.S. Cl. .......................... 425/444; 425/438; 425/534; 425/556
[58] Field of Search ................................ 425/444, 556, 425/534, 438

[56] References Cited

U.S. PATENT DOCUMENTS

| | | | |
|---|---|---|---|
| 3,852,011 | 12/1974 | Maiocco | 425/444 |
| 4,140,464 | 2/1979 | Spurr et al. | 425/533 |
| 4,204,824 | 5/1980 | Paradis | 425/444 |
| 4,690,633 | 9/1987 | Schad et al. | 425/526 |
| 4,721,452 | 1/1988 | Delfer, III | 425/547 |
| 4,814,134 | 3/1989 | Brown | 264/297.8 |
| 4,901,589 | 2/1990 | Gaigl | 425/444 |
| 4,915,611 | 4/1990 | Brown | 425/556 |
| 5,206,039 | 4/1993 | Valyi | 425/526 |
| 5,338,172 | 8/1994 | Williamson et al. | 425/143 |
| 5,354,194 | 10/1994 | Kresak | 425/436 R |
| 5,443,360 | 8/1995 | Lamb et al. | 414/799 |
| 5,569,476 | 10/1996 | Von Manen et al. | 425/556 |
| 5,653,934 | 8/1997 | Brun, Jr. et al. | 425/534 |

FOREIGN PATENT DOCUMENTS 0 718 084 A2   6/1996   European Pat. Off. .

Primary Examiner—James P. Mackey
Attorney, Agent, or Firm—Locke Reynolds

[57] ABSTRACT

A molded article retrieval apparatus in combination with a plastic article molding machine. The molding machine has at least a first mold portion and a second mold portion, at least one of the first and second mold portions being reciprocally movable with respect to the other mold portion, between a conjoined position, wherein a set of articles of plastic can be formed in a set of cavities defined by the conjoined first and second mold portions, and a spaced-apart position, wherein the set of articles of plastic can be released from the cavities into a gap formed between the first and second mold portions. The molded article retrieval apparatus includes an article carrier having at least two sets of article receivers, each set of article receivers being positionable at a different lateral alignment of the article carrier within the gap to receive an entire set of the articles of plastic, and a mover for moving the article carrier into and out of the gap. An alignment mechanism is provided for aligning the article carrier within the gap to permit engagement of the set of articles by any one the sets of article receivers carried by the article carrier. The alignment mechanism includes at least one pin fixed to one of the first and second mold portions and projecting into the gap, and at least one fork fixed to the article carrier. Each fork has two tines separated by a slot projecting from the article carrier toward the pin so that the pin is received in the slot when the article carrier is aligned in the gap with any of the sets of article receivers confronting the set of articles to be retrieved. The slot of at least one fork being dimensioned to engage the at least one pin over a range of different lateral alignments of the article carrier permitting any of the sets of article receivers to be employed to receive the set of molded articles.

17 Claims, 3 Drawing Sheets

MOLDED ARTICLE RETRIEVAL APPARATUS

BACKGROUND OF THE INVENTION

1. Field of the Invention

The present invention generally relates to the field of machines for injection molding hollow plastic articles, and more particularly concerns machines for injection molding hollow plastic articles which are subsequently reheated and blow molded into containers such as oriented hollow plastic containers.

2. Description of the Prior Art

Hollow plastic articles or preforms produced by injection molding generally have relatively thick walls and are molded at relatively high temperatures. After removal from the mold, the hollow plastic articles must be cooled sufficiently to prevent their deformation or adhesion to one another. However, their thick walls act as an insulator tending to trap heat inside the wall. A high rate of production is important in commercial operations, and the rate at which the injection molding cycle can produce preforms is limited by the time taken to cool the preforms sufficiently to allow post molding handling without damage to the preform. Molding cycles have been reduced to the point that there is insufficient time left for the molded articles to be completely cooled in a transporter before it is needed to retrieve the molded articles from the next molding cycle.

Cooling the articles in the mold by means of thermal contact with cooled mold surfaces quickly chills the inner and outer skins, but mold cooling removes the heat trapped within the wall only by keeping the articles in the mold for an extended period of time, which is economically undesirable. Initially cooling the skin of the molded articles may be sufficient to permit ejection from the mold without damage, but additional cooling is then immediately required to remove additional heat conducted to the skin. If the additional cooling were omitted, the skin temperature would rise and tend to cause the molded articles to stick together, to become prone to surface damage, to bend, or warp, and or to crystallize.

One plastic article molding machine capable of rapid cycling is disclosed in U.S. Pat. No. 4,721,452 and includes a carrier plate cooperating with an injection molding machine and having a plurality of sets of article receivers for cooling preforms, with the number of article receivers corresponding to a multiple of the number of preforms produced in an injection molding cycle. The molding machine further includes means for positioning one set at a time of the carrier plate cavities in juxtaposition with formed preforms, and means for transferring the preforms to selected article receivers. Unfortunately, during operation of the molding machine, the carrier plate tends to move out of properly aligned position within the gap between the first and second mold portions, with the preforms thereby subjected to undesired and perhaps damaging contact with the molding machine. Similar problems can also occur with other article receivers used in conjunction with molding machines such as those disclosed in U.S. Pat. Nos. 4,140,464; 4,690,633; 4,814,134; 4,915,611; 5,206,039; 5,338,172; 5,354,194; 5,443,360 and European Patent Publication EP 0 718 084 A2.

SUMMARY OF THE INVENTION

In order to aid in the understanding of the present invention, it can be stated in essentially summary form that it is directed to an improved plastic article molding machine having an alignment mechanism for aligning the article carrier plate within the gap between the first and second mold portions to permit engagement of a set of hollow plastic articles by any one of sets of the article receivers carried by the carrier plate.

More specifically, the present invention includes an apparatus for producing hollow plastic articles including a multicavity horizontal injection molding machine including a first mold portion or cavity half, and a second mold portion or core half. The first mold portion defines a plurality of cavities, and the second mold portion has a plurality of elongate cores corresponding to the number of cavities. The cores are each engagable with a respective cavity in a mold-closed position to form a closed mold, for the formation of a hollow plastic article by injection molding. The cores reciprocate from a mold-closed position, seated in the cavities, for the formation of the hollow articles, to a mold-open position, spaced from the cavities, forming a gap between the cores and the cavities for ejection of the hollow articles. The mold portions may reciprocate on tie rods powered by a motive means, in a pre-determined cycle, and plastic material is injected into the volume formed between each core and cavity when in the mold-closed position. Formed hollow plastic articles may be retained on the cores after formation of the plastic articles and upon reciprocation of the mold portions from the mold-closed position to the mold-open position. Retention of the plastic articles on the cores is aided by shrinkage onto the cores. Removal of the hollow plastic articles from the cores onto an article carrier plate may be accomplished using air pressure supplied through air lines and/or by the use of a stripper plate.

The article carrier plate may be provided with at least two sets of receivers for cooling the hollow plastic articles. The number of receivers in the carrier plate corresponds to a multiple of the arrangement of the cavities of the first mold portion and are a multiple of at least two times the number of hollow plastic articles produced in an injection molding cycle. Each set of the carrier plate receivers corresponds to the arrangement of the first mold portion cavities, with each of sets of carrier plate receivers spaced apart by a fixed distance.

Motive means may be provided for moving the carrier plate into and out of the gap between the first and second mold portions, and may include a slide on which the carrier plate is moved. A positioning means may be provided, including a first portion in fixed relationship to the carrier plate and moveable with the carrier plate into and out of the gap, and a second portion engagable with the first portion for aligning one selected set of carrier plate receivers with the hollow plastic articles formed in an injection molding cycle. The positioning means is used to control the inboard or receiving position of the carrier plate and the carrier plate receivers, and may include means to programmably select one of several receiving positions depending upon the specific set of receivers in the carrier plate that has been selected to receive the hollow plastic articles. A second alignment portion of the positioning means may include a plurality of projections spaced apart by a distance corresponding to the spacing of the sets of carrier plate receivers. The projections may be of different lengths. The first alignment portion includes an end stop engagable with one of the projections so that the positioning means will stop carrier plate at the receiving position which corresponds to the desired carrier plate receiver. By rotating the second alignment portion, with the motive means coordinated with movement of the carrier plate, the appropriate alignment projection can be positioned to stop the carrier plate at the proper position on its next cycle.

Any convenient method may be selected for positioning the carrier plate in the gap between the first and second mold positions, for example, by means of electrical DC servo drives. Controlling the drives by a microprocessor means may position the carrier plate in different locations on subsequent cycles.

The hollow plastic articles transfer to the appropriate carrier plate receivers from the mold cores or from the mold cavities, for example using the stripper plate. When one set of receivers is filled with a set of hollow plastic articles corresponding to those produced in one injection molding cycle, the carrier plate is moved to a position spaced from the first and second mold positions and a second injection molding cycle is performed. The procedure is repeated and the hollow plastic articles produced in the second injection molding cycle are loaded into a second set of carrier plate receivers for cooling in a manner similar to those loaded in the first cycle. The procedure may be repeated, whereupon those hollow plastic articles previously loaded have resided in the carrier plate for a period of time necessary for appropriate cooling.

When all the carrier plate receivers in the carrier plate are filled with hollow plastic articles for cooling, those hollow plastic articles which were first loaded and have been subject to cooling the longest are ready to be discharged for further processing, as desired. On the next cycle, the carrier plate is stopped by the positioning means in such a receiving position that the next set of hollow plastic articles is loaded into the set of carrier plate receivers just vacated. By so operating the carrier plate, the hollow plastic articles can be stored in the carrier plate for the same number of cycles as there are sets of receivers. Thus, sufficient additional cooling of the hollow plastic articles is provided so that upon discharge, the articles will not incur damage from further handling.

The present invention provides an alignment mechanism for aligning the article carrier plate within the gap between the first and second mold portions to permit engagement of a set of hollow plastic articles by any one of the sets of the article receivers carried by the carrier plate. The alignment mechanism includes at least one pin fixed to the first mold portion and projecting into the gap between the first and second mold portions. Alternatively, the pin may be fixed to the second mold portion and project into the gap between the first and second mold portions. The alignment mechanism further includes at least one fork fixed to the carrier plate, with each fork having two tines separated by a slot projecting from the carrier plate toward the pin. Each pin may be received in a slot when the carrier plate is aligned in the gap between the first and second mold portions, with any of the sets of article receivers confronting the set of articles to be retrieved. The slot may be dimensioned to engage the pin over a range of different lateral alignments of the carrier plate, permitting any of the sets of article receivers to be employed to receive the set of molded hollow plastic articles.

A pair of opposing, spaced-apart pair of lower friction surfaces are mounted to confronting inner surfaces of the tines, thereby defining the slot. The lower friction surfaces may be formed of any of a number of available materials that provide a relatively low friction surface. In addition, the lower friction surfaces may detachable from the fork, thereby permitting rapid and easy replacement of the lower friction surfaces that have become worn as a result of repeated engagement with the pins. The lower friction surfaces include tapered portions at distal ends of the fork, with the tapered portions acting to guide a pin between the tines of the fork. Each fork also includes a base for coupling the fork to the carrier plate, with the base including elongated slots for adjustable attachment of the fork to the carrier plate using fasteners, to insure proper alignment of the carrier plate with the articles to be transported.

Each pin includes a body portion, a head portion, and a neck portion joining the head portion to the body portion. The neck portion may be dimensioned smaller than either the body portion or the head portion to substantially match the distance of separation between the tines of the fork that is, the width of the slot, for engaging a pin. Tapered segments are disposed between the neck portion and the body portion and between the neck portion and the head portion.

In a second embodiment of the present invention, each article receiver may include a generally cylindrical sleeve defining a chamber into which a molded hollow plastic article can be received. A piston is movably situated at an inner end of each cylindrical sleeve, and has a piston surface adapted to contact a molded hollow plastic article. A fluid actuator is coupled to each piston for displacing the piston so that any article within the chamber is displaced outwardly therefrom. A fluid actuator of each article receiver is coupled through a fitting to other fluid actuators connected to the same set of article receivers. Fluid supply means supply fluid to each set of the fluid actuators so that the pistons of each set of the article receivers can be displaced outwardly as a set, to effect transfer of the molded hollow plastic articles from one set of the article receivers without displacing the molded hollow plastic articles from any other set of article receivers.

DESCRIPTION OF THE PREFERRED EMBODIMENTS

The following portion of the specification, taken in conjunction with the drawings, sets forth the preferred embodiments of the present invention. The embodiments of the invention disclosed herein are the best mode contemplated for carrying out this invention in a commercial environment, although it should be recognized and understood that various modifications can be accomplished within the parameters of the present invention.

Figure 1:
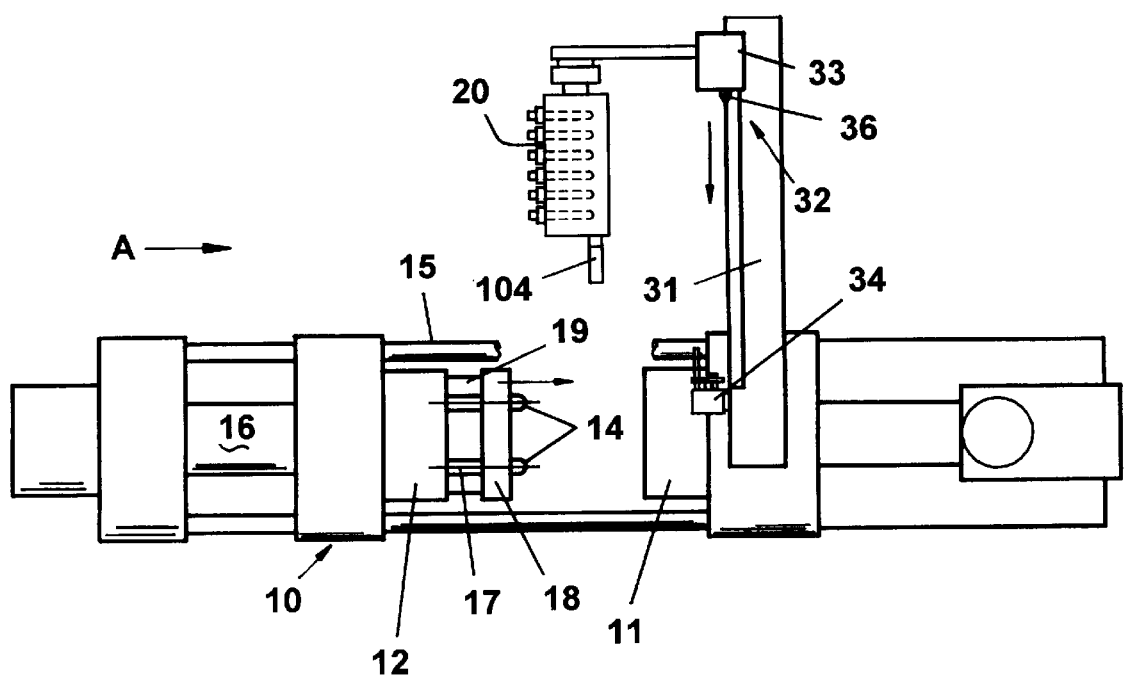
FIG. 1 is a plan view of an improved plastic article molding machine representing the present invention.
Figure 2:
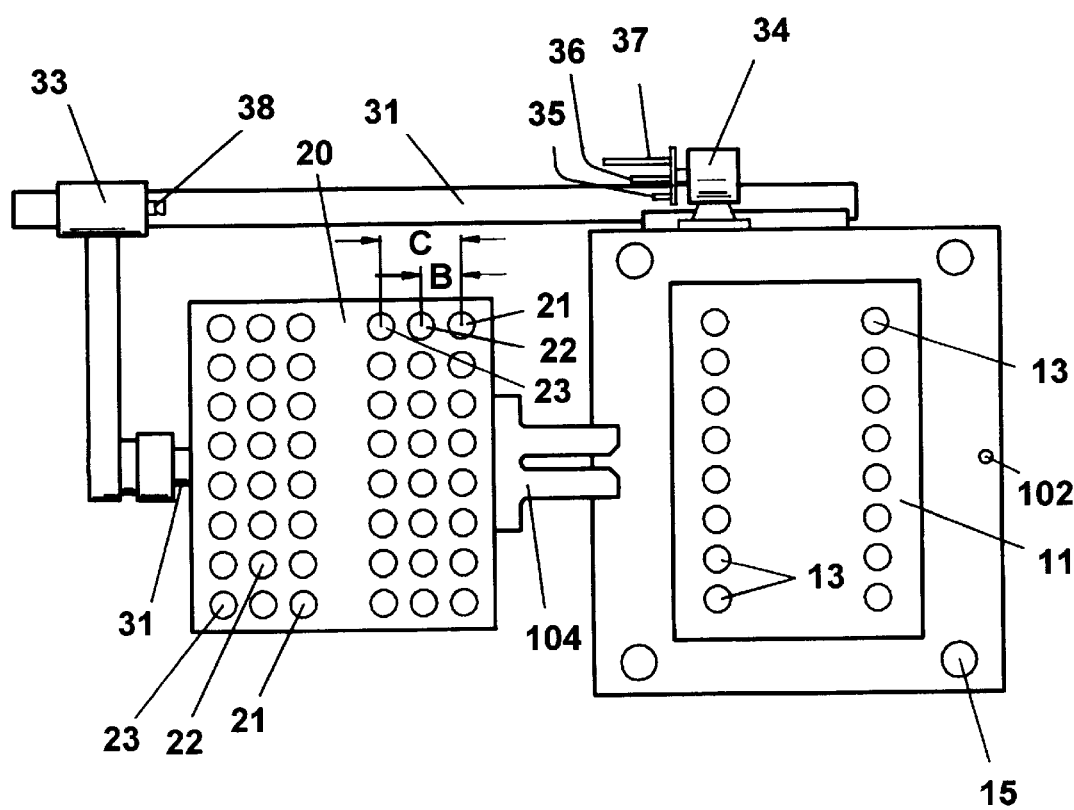
FIG. 2 is an end view of the first mold portion and the carrier plate in the direction "A" of FIG. 1 of an improved plastic article molding machine representing the present invention, with the carrier plate in the outboard position or position spaced from the gap between the first and second mold portions.

Referring now to the drawings for a detailed description of a first embodiment of the present invention, reference is first made to FIGS. 1–2, generally depicting an improved plastic article molding machine including a multicavity horizontal injection molding machine 10. The number of cavities and the arrangement thereof shown in the drawings are exemplary only, and any convenient number of cavities and arrangement thereof may be employed. A single cavity arrangement may also be used, although multicavity arrangements are preferred for economic reasons.

Machine 10 includes a first mold portion 11 which is a cavity half and a second mold portion 12 which is a core half. First mold portion or cavity half 11 defines at least one cavity 13 and preferably defines a plurality of cavities 13. A representative cavity arrangement, shown in FIG. 2, depicts two spaced rows of cavities 13, with each row containing eight cavities.

Second mold portion or core half 12 has at least one elongate core 14, with the number of cores corresponding to the number of cavities. Cores 14 are each engagable with a respective cavity 13 in a mold-closed position to form a closed mold, for the formation of a hollow plastic article by injection molding. The number of articles formed in an injection molding cycle will depend on the number of cavities 13 and corresponding cores 14. Normally, cores 14 will reciprocate from a mold-closed position, seated in cavities 13, for the formation of the hollow articles, to a mold-open position, spaced from cavities 13, forming a gap between cores 14 and cavities 13 for ejection of the hollow articles. FIG. 1 shows first and second mold portions 11 and 12 in a mold-open position. The mold portions 11 and 12 reciprocate on tie rods 15 powered by any convenient motive means, such as by hydraulic cylinder 16, in a pre-determined cycle. Plastic material is injected into the volume formed between each core 14 and cavity 13 in the mold-closed position by known injection molding procedures.

It is preferred to retain the formed hollow plastic articles on cores 14 after formation of the plastic articles and upon reciprocation of mold portions 11 and 1 2 from the mold-closed position to the mold-open position. Retention of the plastic articles on cores 14 is aided by shrinkage onto core 14. Removal of the hollow plastic articles from cores 14 onto article carrier plate 20 may be accomplished by blowing air through lines 17 and/or by the use of stripper plate 18 reciprocating on guide pins 19.

Article carrier plate or cooled robot storage plate 20 may be provided with at least two sets of receivers for cooling the hollow plastic articles. The number of receivers in carrier plate 20 corresponds to a multiple of the arrangement of cavities 13 of first mold portion 1 1 and are a multiple of at least two times the number of hollow plastic articles produced in an injection molding cycle. The embodiment shown in FIG. 2 includes a first set of carrier plate receivers 21, a second set of carrier plate receivers 22, and a third set of carrier plate receivers 23. Each set of carrier plate receivers 21, 22 and 23 corresponds to the arrangement of first mold portion cavities 1 3, with each of sets of carrier plate receivers 21, 22, 23 being spaced apart by a fixed distance.

It will be appreciated that the specific arrangement of first mold portion cavities 13 and sets of carrier plate receivers 21, 22 and 23 depicted in FIGS. 1–2 are exemplary only and other arrangements can be readily used.

Carrier plate 20 has a first set of carrier plate receivers 21 identical in arrangement to first mold portion cavities 13, with the same relative positioning. In addition, the first, second and third sets of carrier plate receivers 21, 22 and 23 are offset from the respective adjacent set by equal distances. The first set of receivers 21 is offset from second set of receivers 22 by a first distance B, and is offset from the third set of receivers 23 by a second distance C. The distances B and C are so arranged as to equally space the additional cavity arrangements in carrier plate 20, with the additional sets of carrier plate receivers 22, 23 being arranged in between the columns of the first set of carrier plate receivers 21. Although two additional sets of carrier plate receivers are shown in FIG. 2, this is only for illustration purposes. Other embodiments can include only one set of carrier plate receivers or several sets of carrier plate receivers depending upon the available space and the use of other cooling apparatus in conjunction with the carrier plate 20.

FIGS. 1 and 2 show carrier plate 20 in the outboard position or in the position spaced from the gap between first and second mold portions 11 and 12. Motive means, not shown, may be provided for moving carrier plate 20 into and out of the gap, including slide 31 on which carrier plate 20 may be moved. Positioning means 32 is provided, including first alignment portion 33 in fixed relationship to carrier plate 20 and moveable with carrier plate 20 into and out of the gap, and second alignment portion 34 engagable with first alignment portion 33 for aligning one selected set of carrier plate receivers 21, 22 or 23 with the hollow plastic articles formed in an injection molding cycle. Positioning means 32 is used to control the inboard or receiving position of carrier plate 20 and carrier plate receivers 21, 22 or 23. Positioning means 32 may include means, not shown, to programmably select one of several receiving positions depending upon the specific set of receivers in carrier plate 20 that has been selected to receive the hollow plastic articles. Second alignment portion 34 of positioning means 32 includes a plurality of projections 35, 36 and 37 spaced apart by a distance corresponding to the spacing of the sets of carrier plate receivers 21, 22 and 23. Thus, projections 35, 36, and 37 are of different lengths, with the differences between the lengths corresponding to distances B and C. First alignment portion 33 includes end stop 38 engagable with one of projections 35, 36 or 37 of second alignment portion 34 so that positioning means 32 will stop carrier plate 20 at the receiving position which corresponds to the desired carrier plate receiver, e.g., projection 37 will stop carrier plates so that first set of carrier plate receivers 21 are aligned with first mold portion cavities 13 and cores 14 and the ejected hollow plastic articles will be loaded into first set of carrier plate receivers 21. By rotating second alignment portion 34, with the motive means coordinated with the movement of carrier plate 20, the appropriate alignment projection can be positioned to stop carrier plate 20 at the proper position on its next cycle. Thus, first projection 37 is longer than second projection 36 by an amount equal to distance B so that when first projection 37 is selected to engage end stop 38, first set of carrier plate receivers 21 will be aligned with mold core 14 so that the hollow plastic articles to be cooled will be aligned with first set of carrier plate receivers 21. Similarly, by selecting second spaced projection 36, the second set of carrier plate receivers 22 will be aligned with mold core 14 for loading a second set of hollow plastic articles produced by a second injection molding cycle.

Any convenient method may be selected for positioning carrier plate 20 in the gap between first and second mold positions 11 and 12, for example, by means of electrical DC servo drives. Controlling the drives by a microprocessor means, not shown, carrier plate 20 may be positioned in different locations on subsequent cycles.

The hollow plastic articles will transfer to the appropriate carrier plate receivers from mold cores 14 or from mold cavities 13, for example, by utilizing stripper plate 18. When one set of receivers, for example set 21, is filled with a set of hollow plastic articles corresponding to those produced in one injection molding cycle, carrier plate 20 is moved to a position spaced from the first and second mold positions and a second injection molding cycle is performed. The procedure is repeated and the hollow plastic articles produced in the second injection molding cycle are loaded into second set of carrier plate receivers 22 for cooling in a manner similar to those loaded in the first cycle. The procedure is repeated for a third time, whereupon those hollow plastic articles loaded in first set of carrier plate receivers 21 have resided in carrier plate 20 for a period of time corresponding to the time necessary to load the three sets of hollow plastic articles into carrier plate 20.

When all carrier plate receivers in carrier plate 20 are filled with hollow plastic articles for cooling, those hollow plastic articles which were first loaded and have been subject to cooling the longest are ready to be discharged for further processing, as desired. On the next cycle, carrier plate 20 is stopped by positioning means 32 in such a receiving position that the next set of hollow plastic articles is loaded into the set of carrier plate receivers just vacated.

By operating carrier plate 20 in this way, the hollow plastic articles can be stored in carrier plate 20 for the same number of cycles as there are sets of receivers in carrier plate 20, thus providing sufficient additional cooling of the hollow plastic articles so that upon discharge the articles will not incur damage from further handling.

Figure 4:
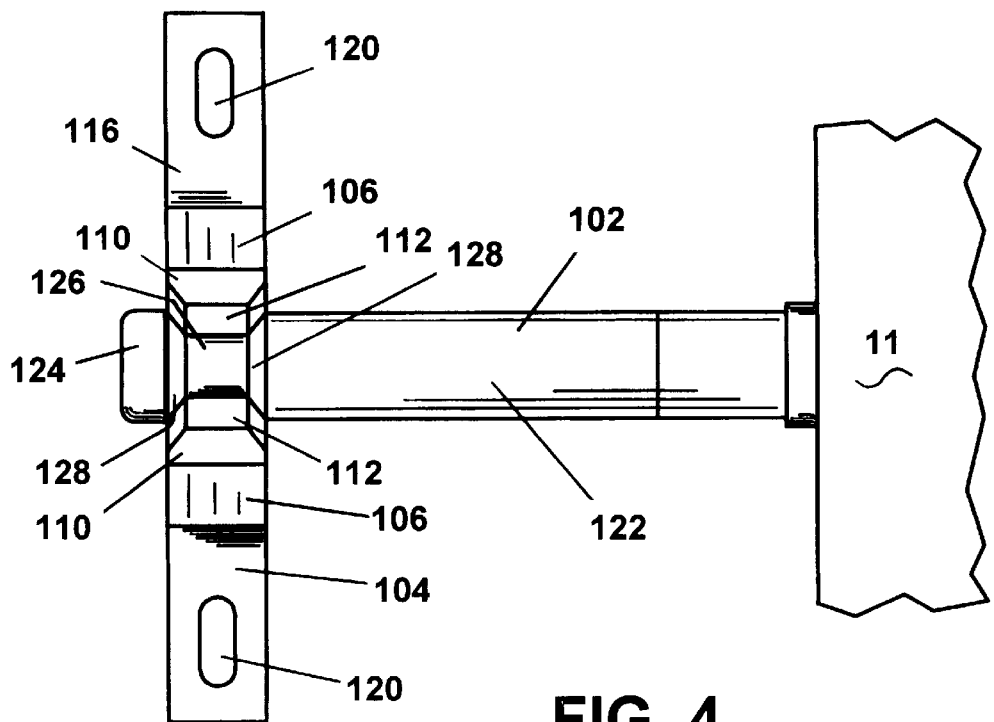
FIG. 4 is an enlarged detail view of the alignment mechanism of an improved plastic article molding machine representing the present invention, taken along line 4—4 of FIG. 3.
Figure 3:
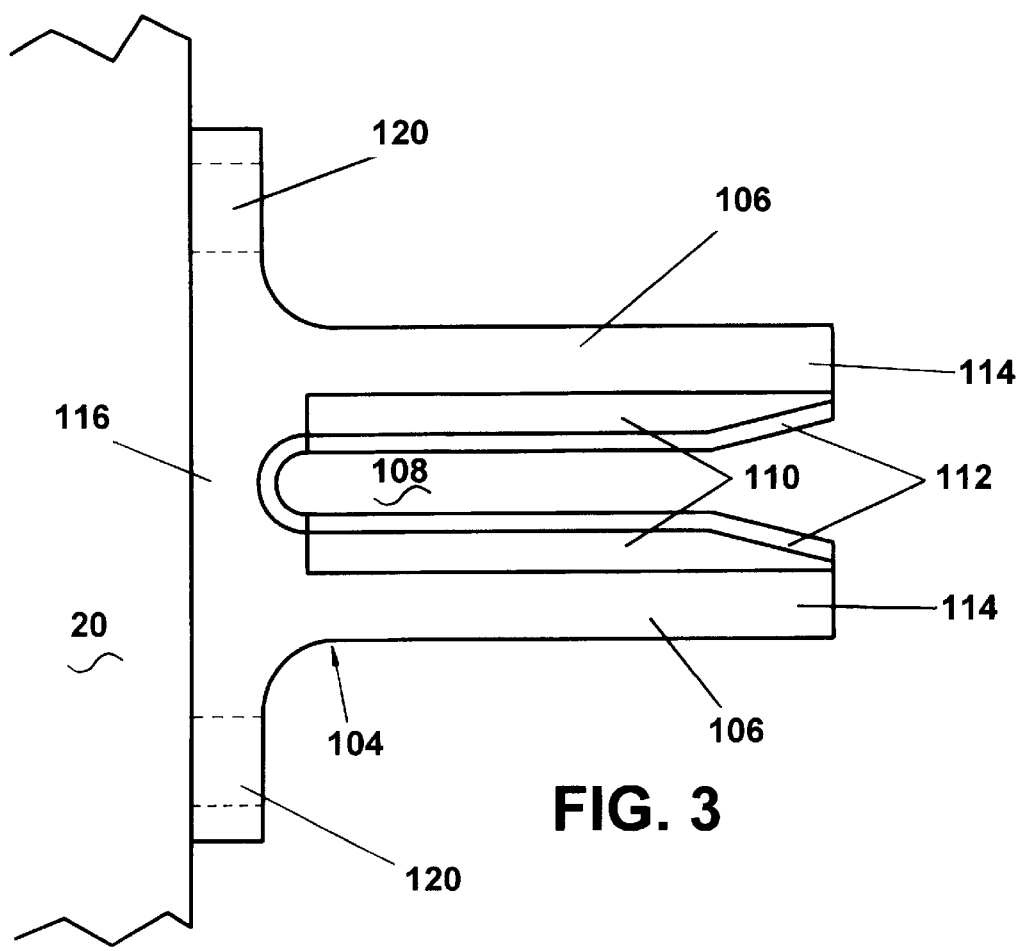
FIG. 3 is an enlarged detail plan view of the fork and base of the alignment mechanism of an improved plastic article molding machine representing the present invention.
Figure 5:
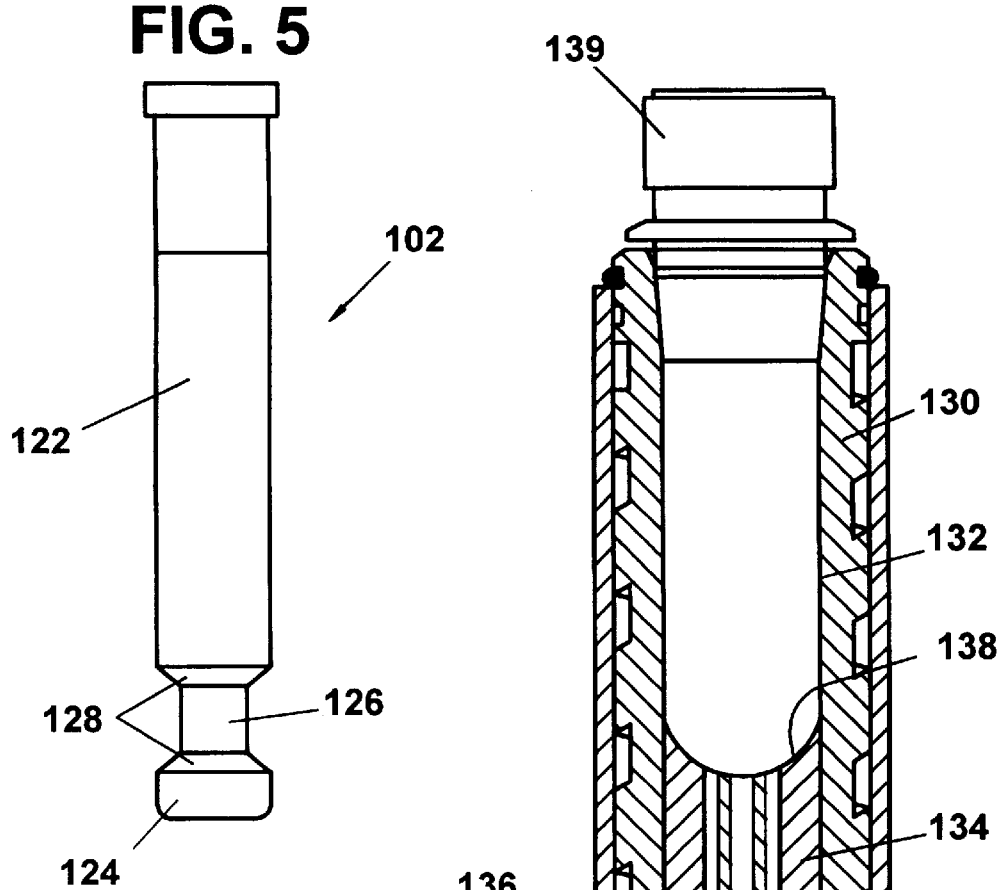
FIG. 5 is an enlarged detail plan view of the pin of the alignment mechanism of an improved plastic article molding machine representing the present invention.

Depicted in FIGS. 3–5 is an alignment mechanism of the present invention, for aligning article carrier plate 20 within the gap between first and second mold portions 11 and 12 to permit engagement of a set of hollow plastic articles by any one said sets of article receivers 21, 22, or 23 carried by carrier plate 20. The alignment mechanism includes at least one pin 102 fixed to first mold portion 11 and projecting into the gap between first and second mold portions 11 and 12. Alternatively, pin 102 may be fixed to second mold portion 12 and project into the gap between first and second mold portions 11 and 12. The alignment mechanism further includes at least one fork 104 fixed to carrier plate 20, with each fork 104 having two tines 106 separated by slot 108 projecting from carrier plate 20 toward pin 102. Each pin 102 may be received in a slot 108 when carrier plate 20 is aligned in the gap between first and second mold portions 11 and 12 with any of the sets of article receivers 21, 22, or 23 confronting the set of articles to be retrieved. Slot 108 may be dimensioned to engage pin 102 over a range of different lateral alignments of carrier plate 20, permitting any of the sets of article receivers 21, 22, or 23 to be employed to receive the set of molded hollow plastic articles.

As shown in FIGS. 3 and 4, a pair of opposing, spaced-apart pair of lower friction surfaces 110 are mounted to confronting inner surfaces 109 of tines 106, thereby defining slot 108. Lower friction surfaces 110 may be formed of any of a number of available materials that provide a relatively low friction surface. Low friction surfaces which may be preferred include surfaces not requiring separately applied lubricants, including self-lubricating polymers such as a polyamide incorporating about 5% molybdenum disulfide, polysiloxane, or polytetrafluroethylene, for example Nylatron DSM available from DSM Engineering Plastics of Evansville, Indiana, thereby preventing contaminating disbursement of applied lubricant to other surfaces. In addition, lower friction surfaces 110 may detachable from fork 104, permitting rapid and easy replacement of lower friction surfaces 110 that have become worn as a result of repeated engagement with pins 102. Lower friction surfaces 110 include tapered portions 112 at distal ends 114 of fork 104, with tapered portions 112 acting to guide a pin 102 between tines 106 of fork 104. Each fork 104 also includes base 116 for coupling fork 104 to carrier plate 20, with base 116 including elongated slots 120 for adjustable attachment of fork 104 to carrier plate 20 using fasteners, not shown, to insure proper alignment of carrier plate 20 with the articles to be transported.

Figure 6:
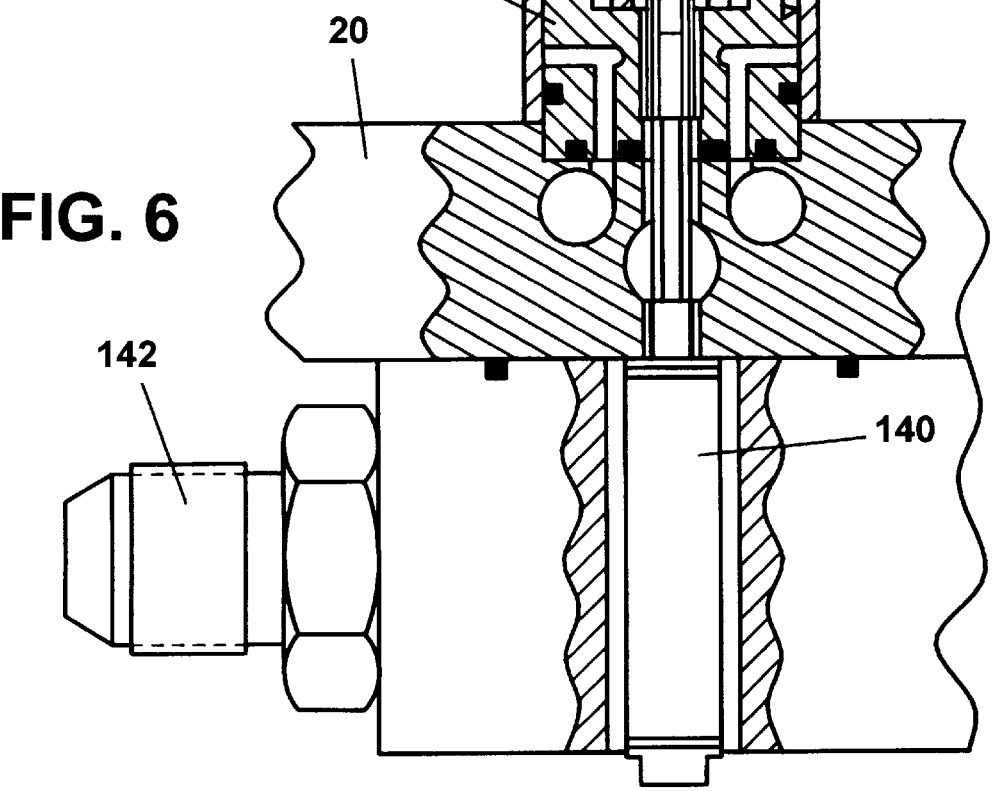
FIG. 6 is an enlarged detail plan view of an article receiver of an improved plastic article molding machine representing the present invention, depicted with a hollow plastic article.

Referring to FIGS. 4 and 6, each pin 102 includes body portion 122, head portion 124, and neck portion 126 joining head portion 124 to body portion 122. Neck portion may be dimensioned smaller than either body portion 122 or head portion 124 to substantially match the distance of separation between tines 106 of fork 104, that is, the width of slot 108, for engaging a pin 102. Tapered segments 128 are disposed between neck portion 126 and body portion 122 and between neck portion 126 and head portion 124.

In a second embodiment of the present invention, as illustrated in FIG. 6, each article receiver of the present invention may include a generally cylindrical sleeve 130 defining chamber 132 into which molded hollow plastic article 133 can be received. Piston 134 is movably situated at inner end 136 of each cylindrical sleeve 130, and has piston surface 138 adapted to contact molded hollow plastic article 133. A fluid actuator 140 is coupled to each piston 134 for displacing piston 134 so that any article within chamber 132 is displaced outwardly therefrom. Fluid actuator 140 of each article receiver is coupled through fitting 142 to other fluid actuators 140 connected to the same set of article receivers. Fluid supply means, not shown, supply fluid to each set of fluid actuators 140, so that pistons 134 of each set of article receivers 21, 22, 23 can be displaced outwardly as a set to effect transfer of the molded hollow plastic articles from one set of the article receivers 21, 22, 23 without displacing the molded hollow plastic articles from any other set of article receivers.

The present invention having been described in its preferred embodiments, it is clear that the present invention is susceptible to numerous modifications and embodiments within the ability of those skilled in the art and without the exercise of the inventive faculty. Accordingly, the scope of the present invention is defined as set forth by the scope of the following claims.

What is claimed is:

1. An alignment mechanism for use in a plastic article molding machine, the molding machine comprising a first mold portion and a second mold portion, at least one of the first and second mold portions being reciprocally movable, with respect to the other mold portion, between a conjoined position, wherein at least one article of plastic can be formed in a cavity defined by the conjoined first and second mold portions, and a spaced-apart position, wherein said at least one article of plastic can be released from the cavity into a gap formed between the first and second mold portions, a molded article retrieval apparatus including an article carrier and a mover for moving the article carrier into and out of the gap, said alignment mechanism aligning the article carrier within the gap to permit engagement of said at least one article by the article carrier, the alignment mechanism comprising:

at least one pin fixed to one of the first and second mold portions and projecting into said gap, and at least one fork fixed to the article carrier, each fork having two tines separated by a slot projecting from the article carrier toward said pin so that the pin is received in the slot when the article carrier is aligned in the gap with an article to be retrieved.

2. The alignment mechanism of claim 1 wherein the at least one pin includes a body portion, a head portion and a neck portion joining the head portion to the body portion, the neck portion being dimensioned to substantially match the distance of separation between the two tines of the fork engaging the pin.

3. The alignment mechanism of claim 2 wherein the neck portion of the at least one pin is smaller than either the body portion or the head portion.

4. The alignment mechanism of claim 3 wherein the at least one pin includes tapered segments between the neck portion and the body portion and between the neck portion and the head portion.

5. The alignment mechanism of claim 1 wherein the at least one fork includes an opposed, spaced pair of lower friction surfaces defining the space between the two tines.

6. The alignment mechanism of claim 5 wherein the at least one fork includes tapered portions at distal ends of the lower friction surfaces for guiding the pin between the tines of the fork.

7. The alignment mechanism of claim 1 wherein the at least one fork includes a base coupling the fork to said article carrier, the base including adjustment means for adjusting the location of the fork with respect to the article carrier to insure proper alignment of the article carrier with the article to be retrieved.

8. The alignment mechanism of claim 1 wherein the article carrier includes a plurality of article receivers, at least one of the article receivers requiring a different lateral alignment of the article carrier within the gap, and the slot of the at least one fork is dimensioned to engage the at least one pin over a range of different lateral alignments of the article carrier.

9. An article receiver assembly for use in conjunction with a molding machine having a first mold portion and a second mold portion, at least one of the first and second mold portions being reciprocally movable, with respect to the other mold portion, between a conjoined position, wherein at least one article of plastic can be formed in a cavity defined by the conjoined first and second mold portions, and a spaced-apart position, wherein said at least one article of plastic can be released from the cavity into a gap formed between the first and second mold portions, and a mover for moving the article receiver assembly into and out of the gap formed between the first and second mold portions, the article receiver assembly comprising:

an article carrier for receiving the at least one article of plastic as it is released from the cavity into the gap, and an alignment mechanism for aligning the article carrier within the gap to ensure engagement of said at least one article by the article carrier, the alignment mechanism including at least one fork fixed to the article carrier, each fork having two tines separated by a slot projecting from the article carrier toward a pin fixed to one of the first and second mold portions and projecting into said gap so that the pin is received in the slot when the article carrier is aligned in the gap with an article to be retrieved.

10. The article receiver assembly of claim 9 wherein the at least one fork includes an opposed, spaced pair of lower friction surfaces defining the space between the two tines, the lower friction surfaces including tapered portions at distal ends of the fork for guiding the pin between the tines of the fork, and a base coupling the fork to said article carrier, the base including adjustment means for adjusting the location of the fork with respect to the article carrier to insure proper alignment of the article carrier with the article to be retrieved.

11. The article receiver assembly of claim 10 wherein each pin includes a body portion, a head portion and a neck portion joining the head portion to the body portion, the neck portion being dimensioned smaller than either the body portion or the head portion to substantially match the distance of separation between the two tines of the fork engaging the pin, and including tapered segments between the neck portion and the body portion and between the neck portion and the head portion.

12. The article receiver assembly of claim 9 comprising a plurality of article receivers, at least one of the article receivers requiring a different lateral alignment of the article carrier within the gap, and the slot of the at least one fork is dimensioned to engage the at least one pin over a range of different lateral alignments of the article carrier.

13. In the combination of a plastic article molding machine having a first mold portion and a second mold portion, at least one of the first and second mold portions being reciprocally movable, with respect to the other mold portion, between a conjoined position, wherein a set of articles of plastic can be formed in a set of cavities defined by the conjoined first and second mold portions, and a spaced-apart position, wherein said set of articles of plastic can be released from the cavities into a gap formed between the first and second mold portions, a molded article retrieval apparatus including an article carrier having at least two sets of article receivers, each set of article receivers being positionable at a different lateral alignment of the article carrier within the gap to receive an entire set of said articles of plastic, and a mover for moving the article carrier into and out of the gap, the improvement comprising:

an alignment mechanism for aligning the article carrier within the gap to permit engagement of said set of articles by any one said sets of article receivers carried by the article carrier, the alignment mechanism including at least one pin fixed to one of the first and second mold portions and projecting into said gap, and at least one fork fixed to the article carrier, each fork having two tines separated by a slot projecting from the article carrier toward said pin so that the pin is received in the slot when the article carrier is aligned in the gap with any of the sets of article receivers confronting the set of articles to be retrieved, the slot of the at least one fork being dimensioned to engage the at least one pin over a range of different lateral alignments of the article carrier permitting any of the sets of article receivers to be employed to receive the set of molded articles.

14. The improvement of claim 13 wherein the at least one fork includes an opposed, spaced pair of lower friction surfaces defining the space between the two tines, the lower friction surfaces including tapered portions at distal ends of the fork for guiding the pin between the tines of the fork, and a base coupling the fork to said article carrier, the base including adjustment means for adjusting the location of the fork with respect to the article carrier to insure proper alignment of the article carrier with the article to be retrieved.

15. The improvement of claim 13 wherein each pin includes a body portion, a head portion and a neck portion joining the head portion to the body portion, the neck portion being dimensioned smaller than either the body portion or the head portion to substantially match the distance of separation between the two tines of the fork engaging the pin, and including tapered segments between the neck portion and the body portion and between the neck portion and the head portion.

16. The improvement of claim 13 wherein each article receiver comprises a generally cylindrical sleeve defining a chamber into which one of the molded articles can be received, a piston movably situated at an inner end of each cylindrical sleeve having a surface adapted to contact the molded article, and a fluid actuator coupled to the piston for displacing the piston so that any article within the chamber is displaced outwardly therefrom.

17. The improvement of claim 16 wherein the fluid actuator of each article receiver is coupled to other fluid actuators connected to the same set of article receivers, and means supplying each set of fluid actuators so that the pistons of each set of article receivers can be displaced outwardly as a set to effect transfer of the molded articles from one set of the article receivers without displacing the molded articles from any other set of the article receivers.

* * * * *